United States Patent
Chiou et al.

(10) Patent No.: US 8,643,577 B2
(45) Date of Patent: Feb. 4, 2014

(54) REPAIRING METHOD AND STRUCTURE OF DISPLAY ELECTRODE

(75) Inventors: Chih-Chien Chiou, Hsinchu (TW);
Yu-Chen Hsu, Hsinchu (TW);
Chi-Ming Wu, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 1067 days.

(21) Appl. No.: 12/041,276

(22) Filed: Mar. 3, 2008

(65) Prior Publication Data
US 2008/0224991 A1 Sep. 18, 2008

(30) Foreign Application Priority Data

Mar. 12, 2007 (TW) ................................ 96108449 A

(51) Int. Cl.
*G09G 3/36* (2006.01)

(52) U.S. Cl.
USPC .................... 345/87; 345/90; 345/92; 345/93; 349/139; 349/141; 349/144; 349/54; 349/55

(58) Field of Classification Search
USPC ........... 349/129–149, 192, 54, 55; 345/87–96
See application file for complete search history.

(56) References Cited

U.S. PATENT DOCUMENTS

| | | | | |
|---|---|---|---|---|
| 6,822,701 | B1 * | 11/2004 | Kasahara et al. | 349/38 |
| 6,839,096 | B1 * | 1/2005 | Jeong et al. | 349/38 |
| 7,728,943 | B2 * | 6/2010 | Nakagawa et al. | 349/143 |
| 2002/0036744 | A1 * | 3/2002 | Kubo et al. | 349/144 |
| 2002/0154079 | A1 * | 10/2002 | Shiota et al. | 345/87 |
| 2004/0246433 | A1 * | 12/2004 | Chen | 349/192 |
| 2005/0156848 | A1 * | 7/2005 | Lee | 345/96 |
| 2007/0002242 | A1 * | 1/2007 | Ogata | 349/139 |

FOREIGN PATENT DOCUMENTS

| | | |
|---|---|---|
| JP | 7-86618 | 9/1995 |
| JP | 09-318958 | 12/1997 |
| JP | 2000-180889 | 6/2000 |
| JP | 2000-221527 | 8/2000 |
| KR | 2001-57021 | 7/2001 |
| KR | 2003-20525 | 3/2003 |

OTHER PUBLICATIONS

English language translation of pertinent part of KR 2003-20525.
English language translation of pertinent part of KR 2001-57021.
English language translation of abstract of JP 2000-221527 (published Aug. 11, 2000).
English language translation of abstract of JP 7-86618 (published Sep. 20, 1995).
English language translation of abstract of JP 2000-180889.
English language translation of abstract of JP 09-318958 (published Dec. 12, 1997).

* cited by examiner

*Primary Examiner* — Gregory J Tryder
(74) *Attorney, Agent, or Firm* — CKC & Partners Co., Ltd.

(57) ABSTRACT

A display electrode structure and the repairing method thereof are described. The display electrode structure includes a display electrode and at least one opening formed on the display electrode and extending toward the inside of the display electrode so as to easily repair a display electrode defect thereon. The display electrode repairing method uses a laser beam to cut a display electrode from the opening and along the metal line to separate the display electrode from an adjacent display electrode so as to remove a short circuit between the display electrode and the adjacent display electrode.

21 Claims, 4 Drawing Sheets

REPAIRING METHOD AND STRUCTURE OF DISPLAY ELECTRODE

RELATED APPLICATIONS

The present application is based on, and claims priority from, Taiwan Application Serial Number 96108449, filed Mar. 12, 2007, which is herein incorporated by reference.

FIELD OF THE INVENTION

The present invention generally relates to a display electrode structure and a repairing method thereof. More particularly, this invention relates to a display electrode structure and a repairing method thereof for a matrix display.

BACKGROUND OF THE INVENTION

The liquid crystal displays (LCDs) possess many advantages, such as, for example, high display quality, small volume occupation, light weight, low driving voltage, and low power consumption. Therefore, the liquid crystal displays are gradually replacing conventional cathode ray tube (CRT) displays and are applied widely to 3C (computers, communications, and consumer electronic) products, for example, personal digital assistants (PDAs), cellular phones, video recording units, notebook computers, desktop monitors and projective televisions.

In the beginning, the transmissive LCDs have been the main field of development. Generally, a light source, called a back light, of a transmissive LCD is located behind the display. Hence, the material used for the pixel electrodes has to be a transparent conductive material such as indium tin oxide (ITO). The back light of a transmission LCD is the most power-consuming component. However, the widest application of LCDs is portable computers and communication products, for which batteries are the main power supply during use. Therefore, decreasing the power consumption of an LCD is the main direction in the development of LCD products.

A reflective LCD is a solution to the problems mentioned above. The light source, such as a natural light source or an artificial light source, of a reflective LCD is located outside the LCD. The electrophoretic display (EPD; also referred to as electronic paper) is a novel optoelectronic display technology.

The electrophoretic display can be applied to, for example, electronic billboards, electronic books, IC cards, and even displays for computers and televisions. The electrophoretic display can be easily scrolled up or attached on any planar surface to demonstrate information and pictures when a control chip is attached thereto.

In general, the electrophoretic display usually comprises two plastic plates with electrodes placed opposing each other to display the image. Therefore, the electrophoretic display is scrollable and cuttable to any desired dimensions. The electrophoretic display is an energy-saving display which can display a static image with very little power consumption. Alternatively, some of the electrophoretic display can also adopt the glass plates to dispose the electrodes thereon for displaying the image.

Generally speaking, the metal lines of the electrophoretic display are isolated to the lower circuits by a resin layer, and the transparent electrodes are disposed thereon. However, the photoresist, which could have impurities therein or any other undesired reasons, cannot be smoothly applied to the substrate while manufacturing the transparent electrodes. Therefore, some of the transparent electrodes are electrically connected together so as to reduce the manufacturing quality of the electrophoretic displays.

Referring to FIG. 1, an electrophoretic display is controlled by scan lines 110 and data lines 120. A defect 130 is formed between the adjacent transparent display electrodes 160 so as to electrically connect the adjacent transparent display electrodes 160. The short circuit caused by the defect 130 between the adjacent transparent display electrodes 160 can therefore interfere with each other so as to degrade the display quality of the electrophoretic display. In general, the defect 130 is cut by forming a first cutting slot 140 and a second cutting slot 150 with a laser beam to isolate the adjacent transparent display electrodes 160. However, the metal line, such as the scan line 110 or the data line 120 under the transparent display electrodes 160, may therefore be damaged by the laser beam while repairing the display electrodes 160. Therefore, the electrophoretic display must either be repaired again to fix the damage on the metal line or scrapped.

SUMMARY OF THE INVENTION

One object of the present invention is to provide a display electrode structure to easily repair a short circuit on display electrodes.

Another object of the present invention is to provide a display electrode structure to effectively prevent damage to the metal lines while repairing a short circuit on display electrodes.

To achieve these and other advantages and in accordance with the purpose of the present invention, as the embodiment broadly describes herein, the present invention provides a display electrode structure disposed on one side of a metal line for the repairer to repair the short circuit on the display electrodes. The display electrode structure includes a display electrode and at least one first opening formed on the display electrode. The first opening is extended to the inside of the display electrode and crosses the metal line.

The display electrode is preferably a transparent electrode, made of Indium Tin Oxide (ITO), Zinc Oxide (ZnO), Cadmium Tin Oxide (CTO), Indium Zinc Oxide (IZO), Zirconium Oxide (ZrO2) or Aluminum Zinc Oxide (AZO). The display electrode is not limited to a transparent electrode and can be an opaque electrode, for example, a metal electrode.

The first opening preferably crosses the metal line, and the metal line is preferably a scan line or a data line. By using an energy beam, for example, a laser beam, to cut the display electrode, a cutting slot extended from the opening is formed on the display electrode to separate the display electrode from the adjacent display electrodes. The cutting slot never overlaps strides the metal line, and is preferably parallel to the metal line. The display electrode may further include a second opening, and the cutting slot connects to the first opening and the second opening to separate the display electrode from adjacent display electrode.

Another aspect of the present invention is to provide a display electrode repairing method. The repairing method utilizes an energy beam, such as a laser beam, to cut the foregoing display electrode structure for repairing a short circuit on the display electrode structure.

Hence, the display electrode structure according to the present invention and the repairing method thereof can allow a repairer easily fixing the display electrodes and prevent damage to the metal line. Therefore, the quantity of output of the display panel can be efficiently increased and the scrap quantity of the display panel can be efficiently reduced.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
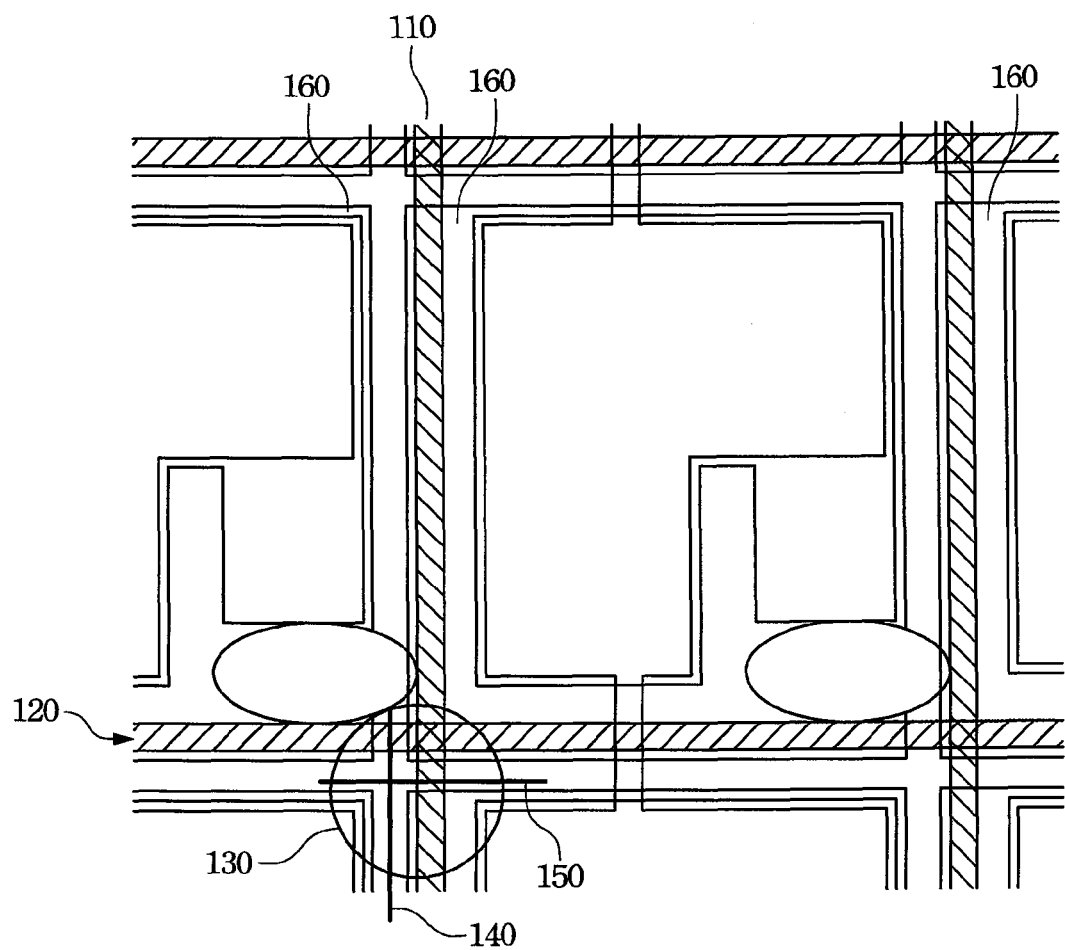
FIG. 1 illustrates a conventional display with a defect and laser beam cutting slots.
Figure 2A:
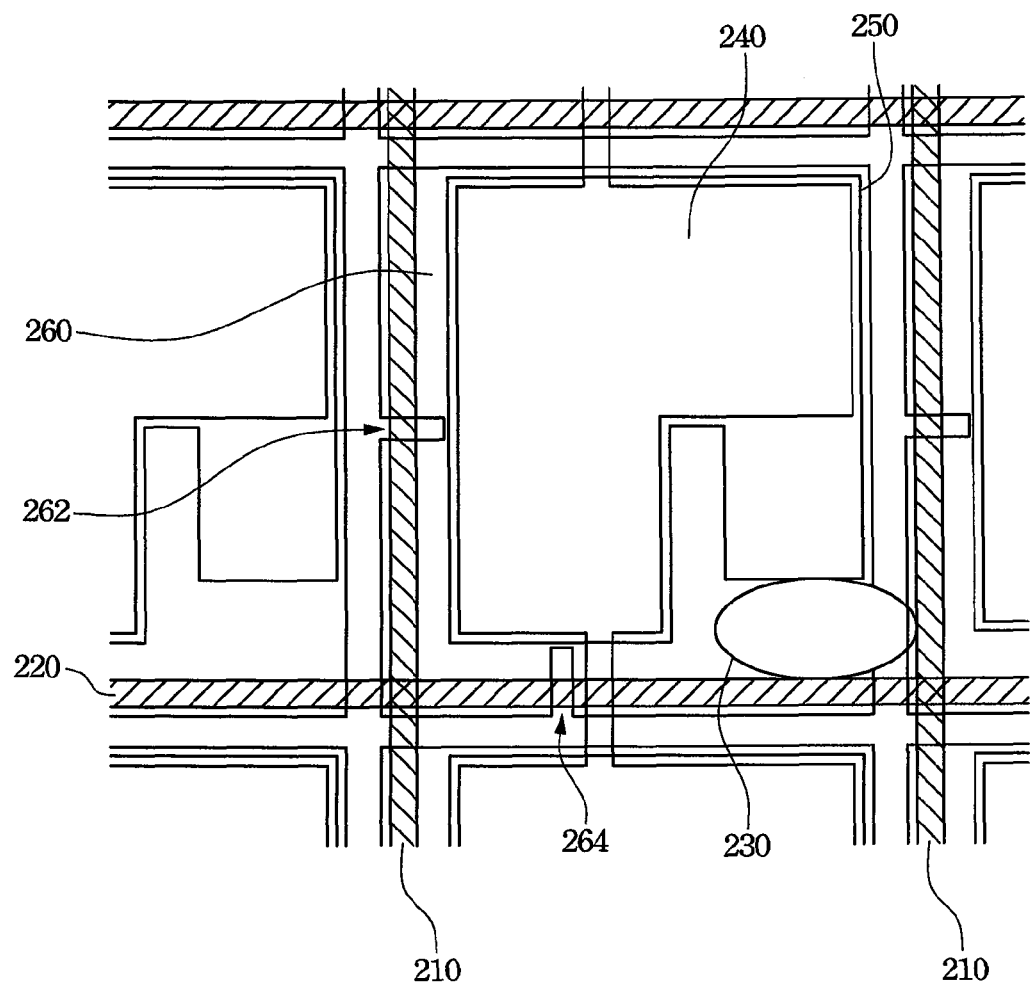
FIG. 2A illustrates a preferred embodiment of a display electrode structure according to the present invention.

FIG. 2A illustrates a preferred embodiment of a display electrode structure according to the present invention. The display electrode structure includes a display electrode 260 and at least one opening, for example, a first opening 262 and/or a second opening 264, formed thereon. When observing the display in front of the display, the display electrode 260 partially overlaps the scan line 210 and the data line 220. In other words, when observing the display through the direction perpendicular to the display, the display electrode 260 partially overlays the scan line 210 and the data line 220. The first opening 262 is preferably extended from the peripheral of the display electrode 260 to the inside of the display electrode 260. The first opening 262 preferably crosses the scan line 210. In addition, the second opening 264 is inwardly extended from the peripheral of the display electrode 260. The second opening 264 preferably crosses the data line 220.

Furthermore, under the display electrode 260, a storage capacitor 240 and a drain electrode extending metal layer 250 are formed in the pixel. A metal layer preferably forms the storage capacitor 240 and the drain electrode extending metal layer 250. The drain electrode extending metal layer 250 is a metal film extended from the drain electrode of the thin film transistor 230. When observing the display in front of the display, the first opening 262 and the second opening 264 are extended to the outside of the drain electrode extending metal layer 250, that is to say, without overlapping with the drain electrode extending metal layer 250 and the storage capacitor 240.

The display electrode 260 is preferably a transparent electrode, made of Indium Tin Oxide (ITO), Zinc Oxide (ZnO), Cadmium Tin Oxide (CTO), Indium Zinc Oxide (IZO), Zirconium Oxide (ZrO2) or Aluminum Zinc Oxide (AZO). However, the display electrode 260 is not limited to a transparent electrode and can be an opaque electrode, for example, a metal electrode.

Figure 3:
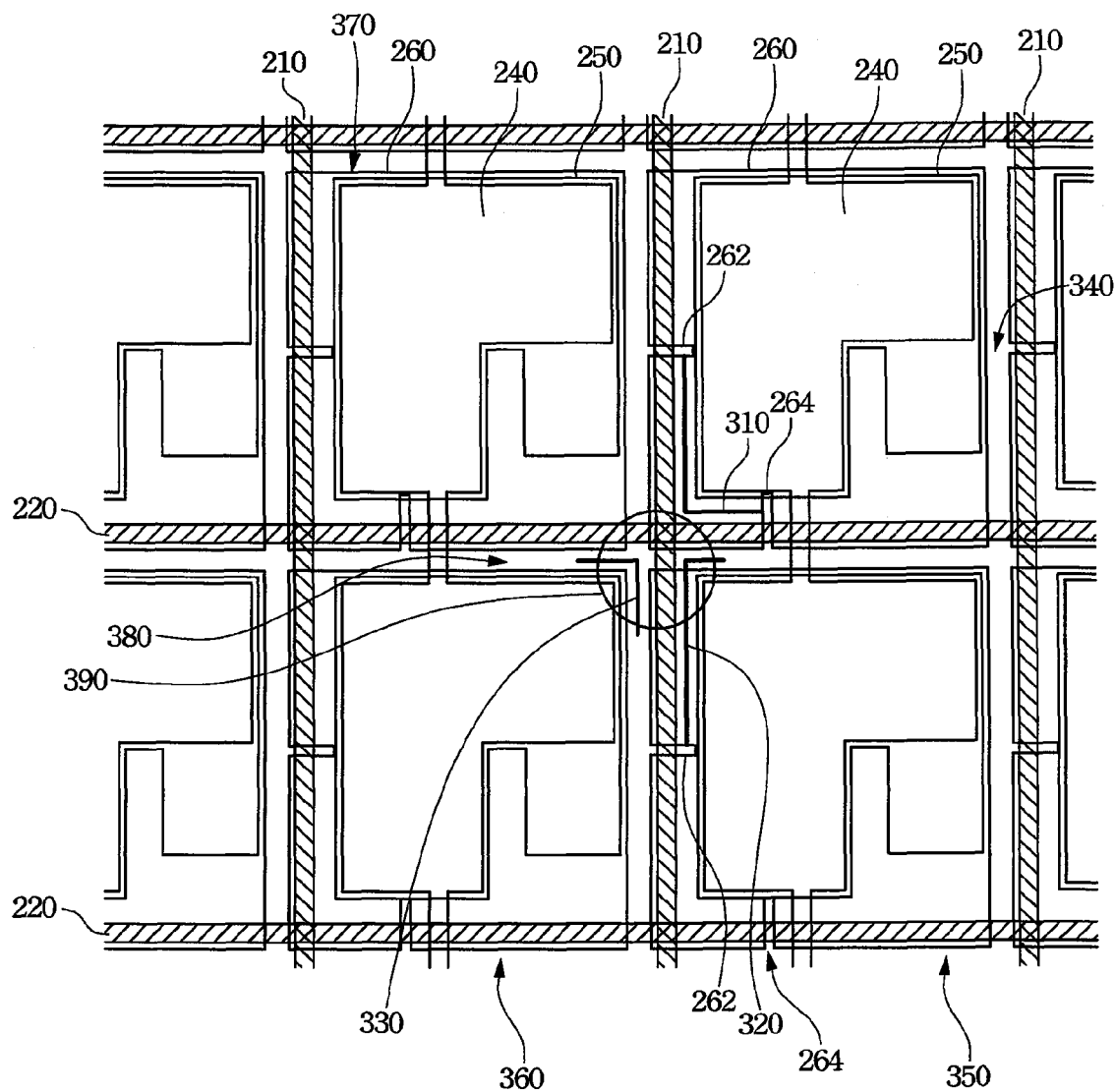
FIG. 3 illustrates laser beam cutting slots to repair the preferred embodiment of the display electrode structure according to the present invention.

Referring to FIG. 3, when a defect 390, such as a residue or any other connection electrically and abnormally connecting the adjacent display electrodes 260, electrically connects the display electrodes 260 of the first pixel 340, the second pixel 350, the third pixel 360 and the fourth pixel 370, a repairer can effectively separate the display electrodes 260 by way of the first opening 262 and/or the second opening 264.

Because the first opening 262 and the second opening 264 respectively cross the scan line 210 and the data line 220, the repairer can easily cut the display electrode 260 and the defect 390 partially over the scan line 210 or the data line 220 by the laser beam or any other energy beam to electrically and physically separate the display electrode 260 from the other adjacent display electrodes.

With focus on the first cutting slot 310, the repairer can use the laser beam to downward cut the display electrode 260 inside the first pixel 340 from the first opening 262, parallel to the scan line 210, and then turn 90 degrees to be parallel with the data line 220 until the second opening 264 is touched. Therefore, the display electrode 260 of the first pixel 340 is physically and electrically separated from the display electrodes 260 of the second pixel 350, the third pixel 360 and the fourth pixel 370. Now turning the focus on the second cutting slot 320, the repairer can further upward cut the display electrode 260 of the second pixel 350 by the laser beam from the first opening 262, parallel to the scan line 210, and then turn 90 degrees to be parallel with the data line 220 until the defect 390 is cut off so as to effectively separate the display electrode 260 of the second pixel 350 and part of the defect 390 from the display electrodes 260 of the third pixel 360 and the fourth pixel 370. Further turning focus on the third cutting slot 330, the repairer can use the laser beam to cut the defect 390 along the opening 380 between the display electrodes 260 of the second pixel 350, the third pixel 360 and the fourth pixel 370. Therefore, the display electrode 260 of the third pixel 360 can be effectively separated from the display electrodes 260 of the fourth pixel 370. Hence, the display electrodes 260 of the first pixel 340, the second pixel 350, the third pixel 360 and the fourth pixel 370 are effectively separate from each other. Therefore, the display electrodes 260 can be independent to the other display electrodes 260 and have no interference on the other display electrodes 260. In addition, each cutting slot is parallel with the scan line 210 or the data line 220 without overlapping the scan line 210 and the data line 220 so that the laser beam can easily cut the defect and the display electrode 260 without damaging the scan line 210 and the data line 220. Accordingly, the display electrode structure and the repairing method thereof can effectively improve the repairing quality and efficiency for the display panel.

Alternatively, the cutting slot can incline to the scan line 210 or the data line 220 with a predetermined angle and without touching either the scan line 210 or the data line 220. The display electrode 260 can still be repaired with the cutting slot. In addition, the quantity and the positions of the openings can be designed according to the actual requirement. The present invention is not limited to the foregoing embodiment. When a defect is disposed between two openings, or one opening and the edge of the display electrode, the repairer can easily and effectively cut the defect to repair the display panel with the display electrode structure and the repairing method according to the present invention.

Figure 2B:
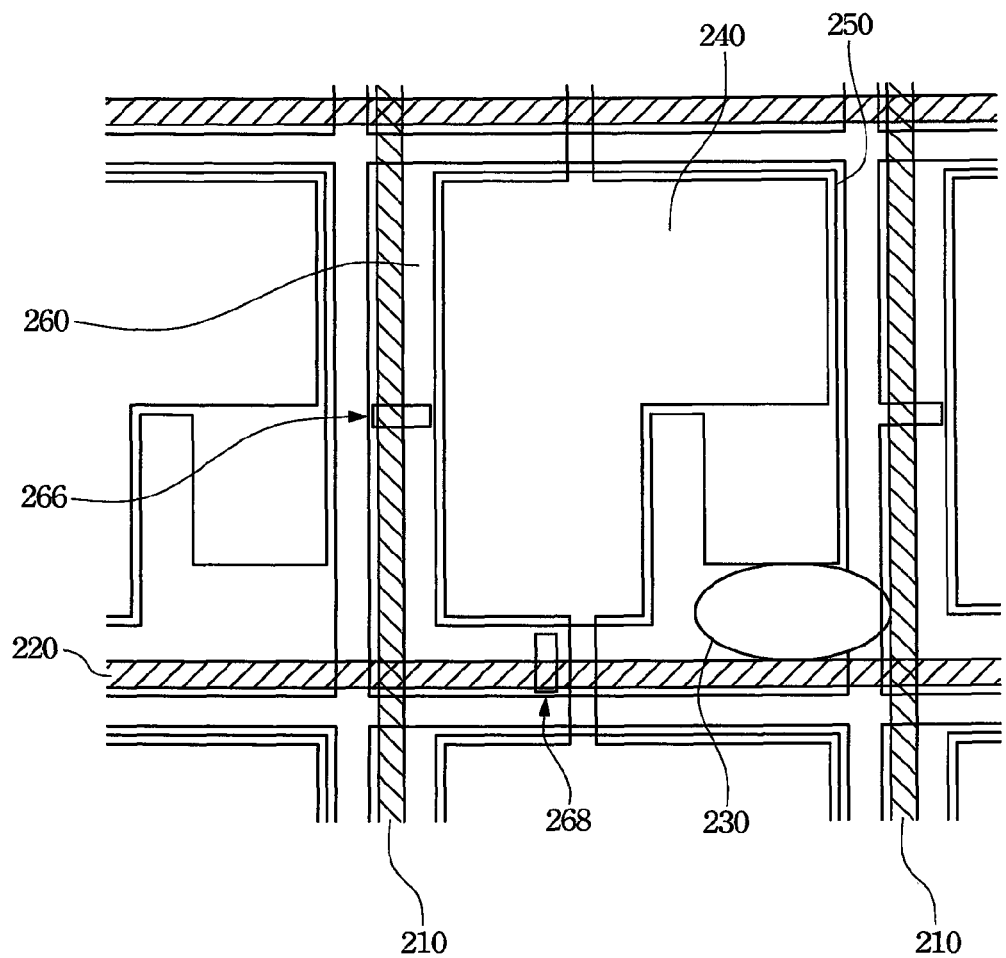
FIG. 2B illustrates another preferred embodiment of a display electrode structure according to the present invention.

Now turning to FIG. 2B, the first opening 266 and the second opening 268 can also be an internal opening formed in the display electrode 260 to cross the scan line 210 or the data line 220. The repairer can use the laser beam to cut the display electrode 260 from the first opening 266 and/or the second opening 268 to the edge of the display electrode 260. While combining with the cutting slots shown in FIG. 3, the display electrode 260 can also be easily repaired.

The display electrode structure according to the present invention and a display panel with the display electrode structure according to the present invention can use the predetermined openings formed on the display electrodes to effectively repair the display electrodes which have short circuit therebetween. In addition, when cutting the display electrode, the laser beam is not necessary to overlap the metal line under the display electrode so as to effectively prevent from damage to the metal line. Accordingly, the display electrode structure according to the present invention can be effectively repaired by cutting the short circuit thereon so as to increase the output quantity of the display panel and reduce the scrap quantity of the display panel.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A display electrode structure, the display electrode structure comprising:
   a display electrode; and
   a first opening formed on the display electrode, extended from a first edge area of the display electrode toward the inside of the display electrode and overstriding a first metal line, wherein the display electrode encompasses opposite sides of the first opening, and the portion of the display electrode encompassing the opposite sides of the first opening is across opposite sides of the first metal line, wherein the first metal line is one of a scan line and a data line, wherein a cutting slot extended from the first opening to a second edge area of the display electrode, adjacent to the first edge area, is formed to cut the display electrode when the display electrode is electrically connected another display electrode adjacent to the display electrode;
   a second opening formed on the display electrode, wherein the second edge area intersects the first edge area, wherein the second opening is extended from the second edge area toward the inside of the display electrode and overstriding a second metal line, wherein the cutting slot connects the first opening and the second opening.

2. The display electrode structure of claim 1, wherein the first opening is extended from an edge of the first edge area of the display electrode.

3. The display electrode structure of claim 1, wherein the first opening is an internal opening formed above the first metal line.

4. The display electrode structure of claim 1, wherein the first opening is perpendicular to the first metal line.

5. The display electrode structure of claim 1, wherein the cutting slot is parallel to the first metal line.

6. The display electrode structure of claim 1, wherein the second metal line is the other one of the scan line and the data line.

7. A display electrode repairing method, comprising:
   providing a display electrode structure having a display electrode and a first opening formed on the display electrode, extended from an first edge area of the display electrode toward the inside of the display electrode and overstriding a first metal line, wherein the display electrode encompasses opposite sides of the first opening, and the portion of the display electrode encompassing the opposite sides of the first opening is across opposite sides of the first metal line, wherein the first metal line is one of a scan line and a data line; and
   utilizing an energy beam to form a cutting slot in the display electrode to cut the display electrode starting from the first opening to a second edge area of the display electrode adjacent to the first edge area when the display electrode is electrically connected another display electrode adjacent to the display electrode, wherein the display electrode structure further comprises a second opening formed on the display electrode, wherein the second edge area intersects the first edge area, wherein the second opening is extended from the second edge area toward the inside of the display electrode and overstriding a second metal line, wherein the cutting slot connects the first opening and the second opening.

8. The display electrode repairing method of claim 7, wherein the first opening is extended from an edge of the first edge area of the display electrode.

9. The display electrode repairing method claim 7, wherein the first opening is an internal opening formed above the first metal line.

10. The display electrode repairing method of claim 7, wherein the first opening is perpendicular to the metal line.

11. The display electrode repairing method of claim 7, wherein the energy beam is a laser beam.

12. The display electrode repairing method of claim 11, wherein the cutting slot cut by the laser beam is parallel to the metal line.

13. The display electrode repairing method of claim 7, wherein the second metal line is the other one of the scan line and the data line.

14. A display electrode structure, the display electrode structure comprising:
    a display electrode; and
    a first opening formed on the display electrode, extended from a first edge area of the display electrode toward the inside of the display electrode and overstriding a first metal line, wherein the display electrode encompasses opposite sides of the first opening, and the portion of the display electrode encompassing the opposite sides of the first opening is across opposite sides of the first metal line, wherein the first metal line is one of a scan line and a data line; and
    a cutting slot extended from the first opening to an second edge area of the display electrode, adjacent to the first edge area, for separating the display electrode from another display electrode electrically connected and adjacent to the display electrode;
    a second opening formed on the display electrode, wherein the second edge area intersects the first edge area, wherein the second opening is extended from the second edge area of the display electrode toward the inside of the display electrode and overstriding a second metal line, wherein the cutting slot connects the first opening and the second opening.

15. The display electrode structure of claim 14, wherein the first opening is extended from an edge of the first edge area of the display electrode.

16. The display electrode structure of claim 14, wherein the first opening is an internal opening formed above the first metal line.

17. The display electrode structure of claim 14, wherein the first opening is perpendicular to the first metal line.

18. The display electrode structure of claim 14, wherein the cutting slot is parallel to the first metal line.

19. The display electrode structure of claim 14, wherein the second metal line is the other one of the scan line and the data line.

20. The display electrode structure of claim 14, wherein the cutting slot is extended along the first metal line and the second metal line.

21. The display electrode structure of claim 6, wherein the cutting slot is extended along the first metal line and the second metal line.

* * * * *